United States Patent
Zhu et al.

(10) Patent No.: US 10,284,303 B2
(45) Date of Patent: May 7, 2019

(54) FEEDFORWARD DECISION-FREE PILOT-AIDED PHASE NOISE ESTIMATION FOR COHERENT OPTICAL M-QAM SYSTEMS

(71) Applicant: Alcatel-Lucent USA Inc., Murray Hill, NJ (US)

(72) Inventors: Chen Zhu, Murray Hill, NJ (US); Noriaki Kaneda, Murray Hill, NJ (US); Young-Kai Chen, Murray Hill, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/612,385

(22) Filed: Jun. 2, 2017

(65) Prior Publication Data
US 2018/0269985 A1    Sep. 20, 2018

Related U.S. Application Data

(60) Provisional application No. 62/473,151, filed on Mar. 17, 2017.

(51) Int. Cl.
*H04B 10/06* (2006.01)
*H04B 10/61* (2013.01)
*H04L 7/00* (2006.01)

(52) U.S. Cl.
CPC ....... *H04B 10/6165* (2013.01); *H04B 10/612* (2013.01); *H04L 7/0029* (2013.01); *H04L 7/0075* (2013.01)

(58) Field of Classification Search
CPC .............. H04B 10/616; H04B 10/6163; H04B 10/6164; H04B 10/6165; H04B 10/548; H04B 10/6161; H04B 10/5561; H04J 14/06

USPC ....... 398/202, 204, 205, 206, 207, 208, 209, 398/210, 212, 213, 214, 183, 188, 135, 398/136, 158, 159, 192, 193, 194, 65, 398/152, 184
See application file for complete search history.

(56) References Cited

U.S. PATENT DOCUMENTS

2011/0274442 A1* 11/2011 Zhang ................ H04B 10/0779
                                                                398/208
2015/0372766 A1* 12/2015 Yoshida ............. H04B 10/2507
                                                                398/193

OTHER PUBLICATIONS

Zhang, et al.; "Decision-Aided Carrier Phase Estimation for Coherent Optical Communications"; Journal of Lightwave Technology, vol. 28, No. 11; IEEE; Jun. 1, 2010; pp. 1597-1607.

(Continued)

*Primary Examiner* — Hanh Phan (57) ABSTRACT

An apparatus includes an electronic digital signal processor having electrical inputs for receiving a first sequence of measurements of values of a transmitted modulated optical carrier received in a coherent optical receiver and having electrical outputs for a stream of determined transmitted data values demodulated therein from the first sequence. The electronic digital signal processor has first circuitry to determine phase offsets of received pilot values from the first sequence. Additionally, the electronic digital signal processor has second circuitry to correct phase offsets of received ones of the data values from the determined phases of pilot values and data values being temporally interleaved in the transmitted modulated optical carrier. A system and a method are also included.

23 Claims, 10 Drawing Sheets

(56) References Cited

OTHER PUBLICATIONS

Pfau, et al.; Hardware-Efficient Coherent Digital Receiver Concept With Feedforward Carrier Recovery for M-QAM Constellations; Journal of Lightwave Technology, vol. 27, No. 8; IEEE; Apr. 15, 2009; pp. 989-999.

Noels, et al.; "Block-Processing Soft-Input Soft-Output Demodulator for Coded PSK Using DCT-Based Phase Noise Estimation"; IEEE Transactions on Communications, vol. 62, No. 8; Aug. 2014; pp. 2939-2950.

* cited by examiner

FEEDFORWARD DECISION-FREE PILOT-AIDED PHASE NOISE ESTIMATION FOR COHERENT OPTICAL M-QAM SYSTEMS

CROSS-REFERENCE TO RELATED APPLICATION

This application claims the benefit of U.S. Provisional Application Ser. No. 62/473,151, filed on Mar. 17, 2017, entitled "FEEDFORWARD DECISION-FREE PILOT-AIDED PHASE NOISE ESTIMATION FOR COHERENT OPTICAL M-QAM SYSTEMS," commonly assigned with this application and incorporated herein by reference.

TECHNICAL FIELD

This application is directed, in general, to apparatus for coherent communication systems and, more specifically, to methods of using such apparatus in a coherent optical system.

BACKGROUND

This section introduces aspects that may help facilitate a better understanding of the inventions. Accordingly, the statements of this section are to be read in this light and are not to be understood as admissions about what is prior art or what is not prior art. Communication systems are under constant demand to increase their ability to convey greater amounts of information both reliably and at ever increasing transfer rates. In order to enhance optical fiber capacity for metro and core network transmission, coherent optical systems with high-order quadrature-amplitude-modulation (QAM) signaling have attracted greater interest. While denser constellations lead to higher spectral efficiency, the signal becomes more sensitive to amplified spontaneous emission noise and laser phase noise, setting new challenges for receiver digital signal processing subsystems. Additionally, some computational schemes may use feedback processing in the coherent optical receiver.

SUMMARY

One embodiment is an apparatus. The apparatus includes an electronic digital signal processor having electrical inputs for receiving a first sequence of measurements of values of a transmitted modulated optical carrier received in a coherent optical receiver and having electrical outputs for a stream of determined transmitted data values demodulated therein from the first sequence. The electronic digital signal processor has first circuitry to determine phase offsets of received pilot values from the first sequence. Additionally, the electronic digital signal processor has second circuitry to correct phase offsets of received ones of the data values from the determined phases of pilot values and data values being temporally interleaved in the transmitted modulated optical carrier.

Another embodiment is a system. The system includes a frame comparator of a coherent optical receiver that compares received pilot symbols of an optical transmission frame with a reference pilot symbol to determine pilot phase angles between the received and reference pilot symbols. The system additionally includes a pilot processor that generates pilot transform coefficients based on the pilot phase angles and pilot transform basis functions and a frame processor that determines a received phase noise value for the optical transmission frame based on the pilot transform coefficients and frame transform basis functions.

Yet another embodiment is a method. The method includes receiving optical transmission frames in a coherent optical receiver having pilot symbols and data symbols arranged in a pattern that provides for calculation of a reception phase noise of the optical transmission frames at the coherent optical receiver based on the pilot symbols, and comparing the received pilot symbols with a reference pilot symbol to determine received pilot symbol phase angles in the optical transmission frames. The method additionally includes calculating discrete cosine transform coefficients based on the received pilot symbol phase angles and received pilot discrete cosine transform basis functions and estimating a reception phase noise of each optical transmission frame based on the pilot discrete cosine transform coefficients and discrete cosine transform basis functions.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

The embodiments of the disclosure are best understood from the following detailed description, when read with the accompanying Figures. Reference is now made to the following descriptions taken in conjunction with the accompanying drawings, in which.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be for pedagogical purposes to aid the reader in understanding the principles of the disclosure and concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the present disclosure provide a pilot-aided technique that exploits the low-pass nature of laser phase noise, e.g., phase noise of the laser of a coherent optical transmitter and/or phase noise of the local optical oscillator of a coherent optical receiver. In some embodiments, the pilot symbol positions within a transmission frame are specifically defined, for example, employing discrete cosine transform (DCT) orthonormal basis functions. This approach can provide a simple, feed-forward and accurate phase noise estimation that is based, for example, purely on the pilot symbols. Additionally, iterative processing may be used to enhance estimation performance by employing data symbol decisions during data demodulation in a DSP of a coherent optical receiver. Furthermore, this scheme may be highly suitable for use with a high speed, digital coherent receiver since it accommodates large amounts of pipelining and parallelization. This approach may be used in polarization division multiplexed (PDM) higher order QAM coherent optical transmission schemes, for example, 64-QAM, 128-QAM and 256-QAM systems. In such systems, the overhead for using such pilot signals may be low, for example, less than 10 percent of the total transmitted data rate, less than five percent of the total transmitted data rate, or even less than two percent of the total transmitted data rate, even without using iterative processing.

Figure 1:
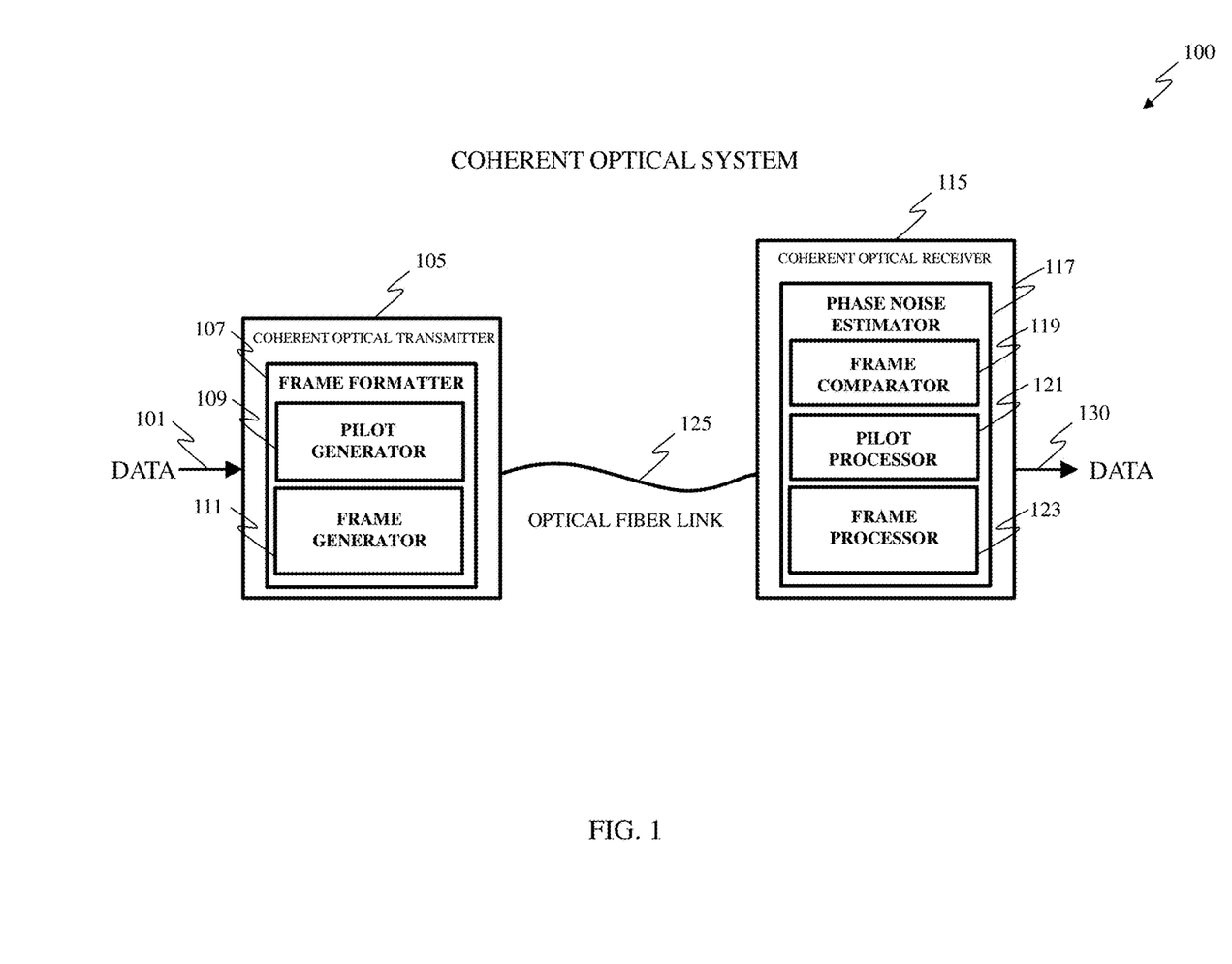
FIG. 1 illustrates a block diagram of an embodiment of a coherent optical communications system constructed according to the principles of the present disclosure.

FIG. 1 illustrates an embodiment of a coherent optical communication system, generally designated 100 constructed according to the principles of the present disclosure. The coherent optical communication system 100 includes a coherent optical transmitter 105 and a coherent optical receiver 115 coupled together by an optical fiber link 125, that may include a sequence of one or more end-connected single-mode optical transmission fibers.

Figure 2:
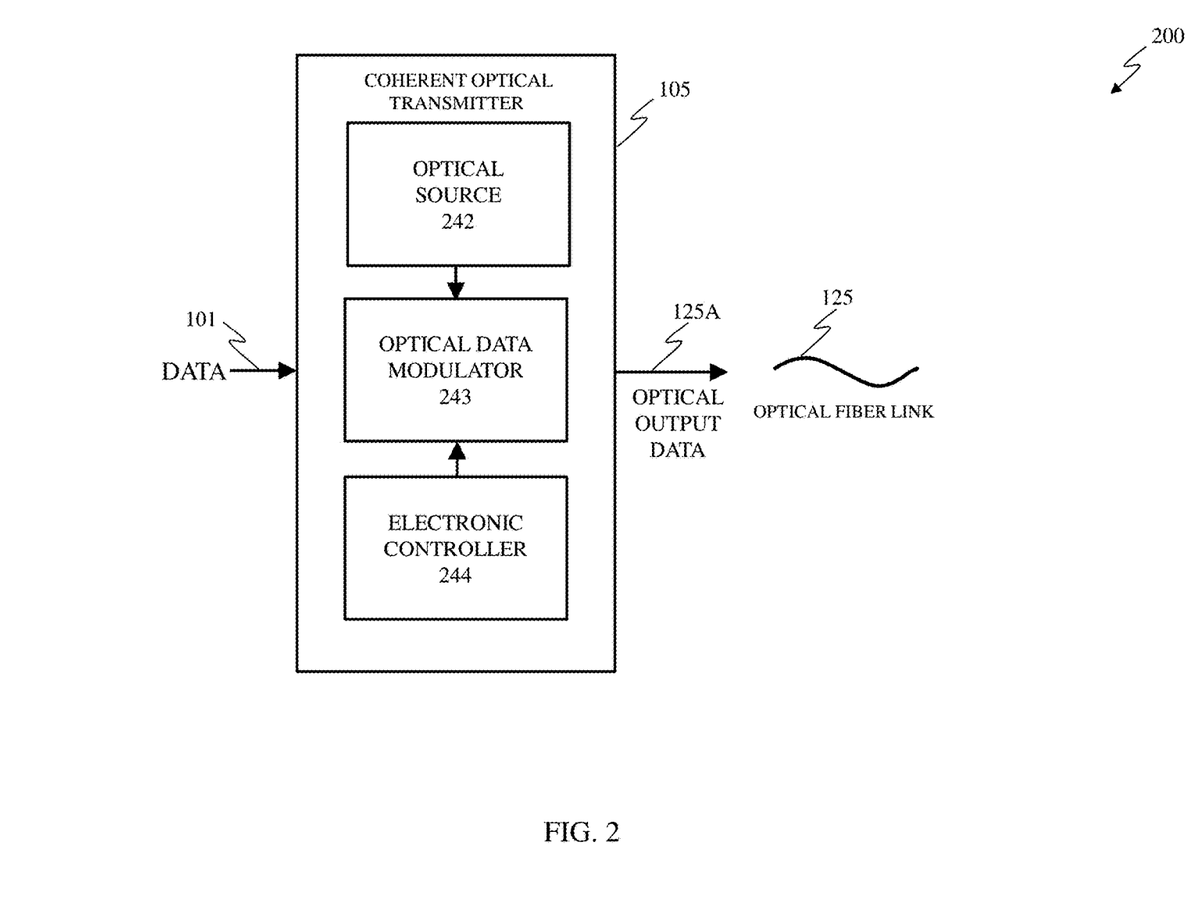
FIG. 2 illustrates a block diagram schematically showing a coherent optical transmitter, e.g., useable in the coherent optical communication system of FIG. 1.

FIG. 2 illustrates a block diagram schematically showing a coherent optical transmitter, e.g., useable in the coherent optical communication system of FIG. 1. Referring to FIG. 2, the coherent optical transmitter 105 includes an optical source 242, an optical data modulator 243, and an electronic controller 244 of the optical data modulator 243.

The optical source 242 is typically a conventional laser, e.g., a narrow-linewidth laser that is temperature controlled to stabilize the wavelength of the optical carrier output therefrom.

The optical data modulator 243 is an optical component connected to receive the optical carrier from the optical source 242 and modulate a plurality of digital data streams, received at the data input 101, thereon. The optical data modulator 243 may be, e.g., a nested array of controllable of Mach-Zehnder optical interferometers (MZIs), e.g., a connected set of integrated single control electrode or dual control electrode (fr push-pull operation) MZIs. For example, the optical data modulator 243 may include, e.g., a parallel nested-array of four MZIs to enable polarization multiplexed, binary phase shift keying (BPSK), quadrature phase shift keying (QPSK), or 8, 16, 32, 64, 128, 256, 512 or higher versions of quadrature amplitude modulation (QAM) keying of data onto the optical carrier.

The electrical controller 244 receives digital data from the data input 101 and electrically drives the optical data modulator 243 to modulate the digital data and pilot signals onto the optical carrier. Typically, the driving involves formatting said received digital data and pilot values in a parallel format so that the data modulated optical carrier carries both digital data and pilot signals. As described below, the pilot values are useable by a coherent optical receiver for carrier phase recovery, e.g., to eliminate phase noise within generated by a local optical oscillator of the optical receiver.

The electronic controller 244 typically includes a frame formatter 107 having a pilot generator 109 and a frame generator 111, which generates the electrical driver values to operate the data optical modulator 243 to modulate a symbol onto the optical carrier from the optical source 242.

Figure 3:
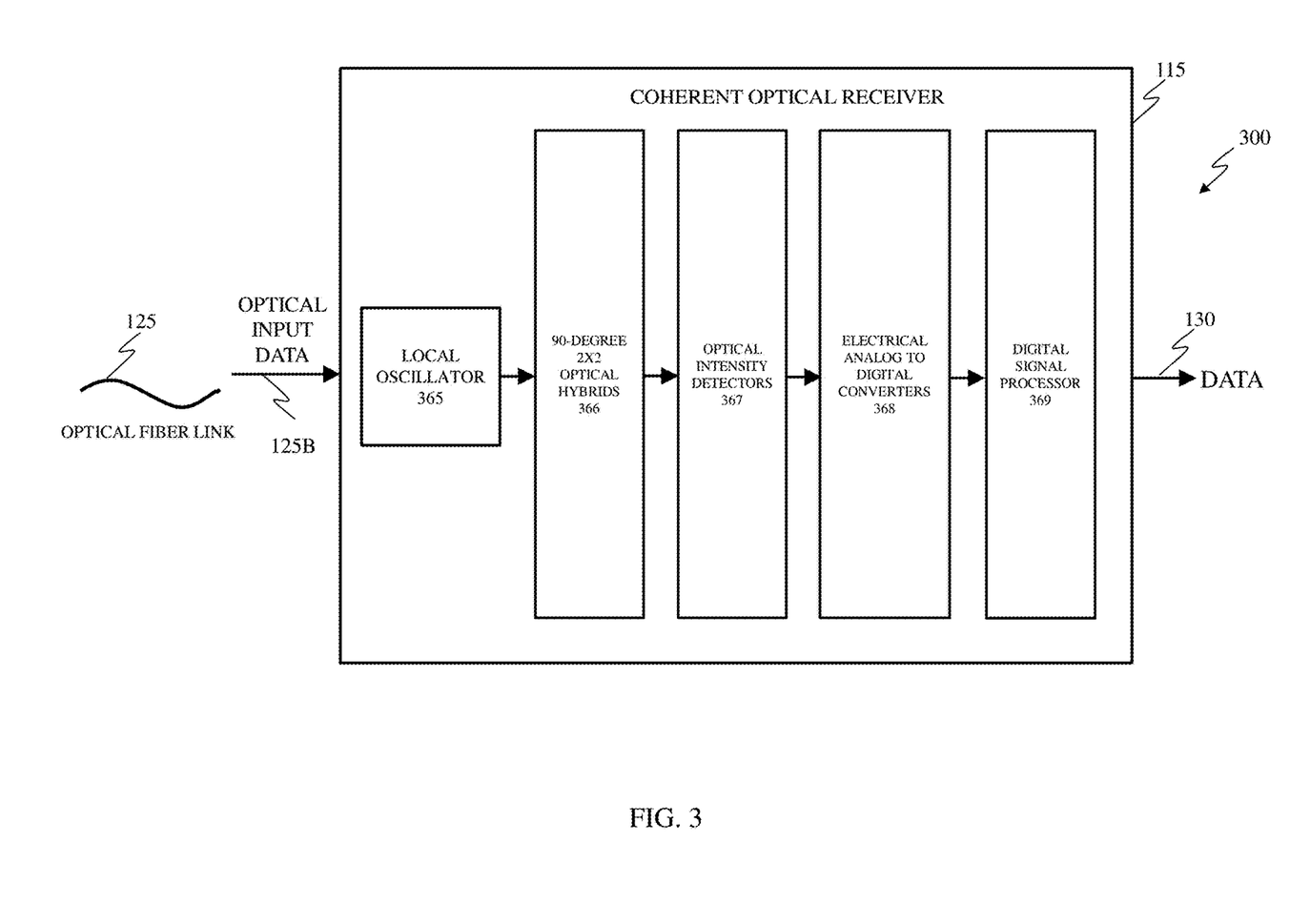
FIG. 3 illustrates a block diagram schematically showing a coherent optical receiver, e.g., employable in the coherent optical communication system of FIG. 1.

FIG. 3 illustrates a block diagram schematically showing a coherent optical receiver, e.g., employable in the coherent optical communication system of FIG. 1. Referring to FIG. 3, the coherent optical receiver 115 includes a local optical oscillator 365, 90-degree 2×2 optical hybrids 366, optical intensity detectors 367, electrical analog to digital converters (ADCs) 368, and a digital signal processor (DSP) 369.

The local optical oscillator 365 produces an optical carrier that is used for phase sensitive detection. The local optical oscillator 365 is typically a conventional narrow-band laser.

Each 90-degree 2×2 optical hybrid 366 has one input to receive one polarization component of the received modulated optical carrier from the optical fiber link 125 and another input to receive light from the local optical oscillator 365, e.g., the same polarization components. The 90-degree 2×2 optical hybrids 366 are conventional interferometers that mix light of the local optical oscillator with light of the received modulated optical carrier to produce output light whose intensities are a representative of the modulation on the modulated optical carrier. The different 90-degree 2×2 optical hybrids 366 may, e.g., be configured orthogonal polarization components of the received data modulated optical carrier to support polarization multiplexing of data. For example, the received data modulated optical carrier may be passed through a polarization splitter that sends one polarization component to each of the 90-degree 2×2 optical hybrids 366.

The optical intensity detectors 367 measure light output at the paired outputs of the 90-degree 2×2 optical hybrids 366 to provide analog electrical signals representative of different phase components, e.g., in-phase and quadrature-phase components, of the two polarization components of the received modulated optical carrier.

The ADCs 368 convert the outputs of the optical intensity detectors 367 into streams of digital signals. The DSP 369 receives the streams of digital signals from the ADCs 368 and performs processing thereon to recover the digital data stream transmitted by the optical transmitter of FIG. 1. Notably, the DSP 369 extracts a value of the pilot signal inserted into each frame and uses a known pilot value to correct for phase offsets so that transmitted data values can be recovered from the streams of the digital data values received by the DSP 369. The values of the pilot signal are typically used to correct for random relative phase noise and may be used to compensate for a phase offset of the local optical oscillator of the optical receiver, as well.

Figure 4:
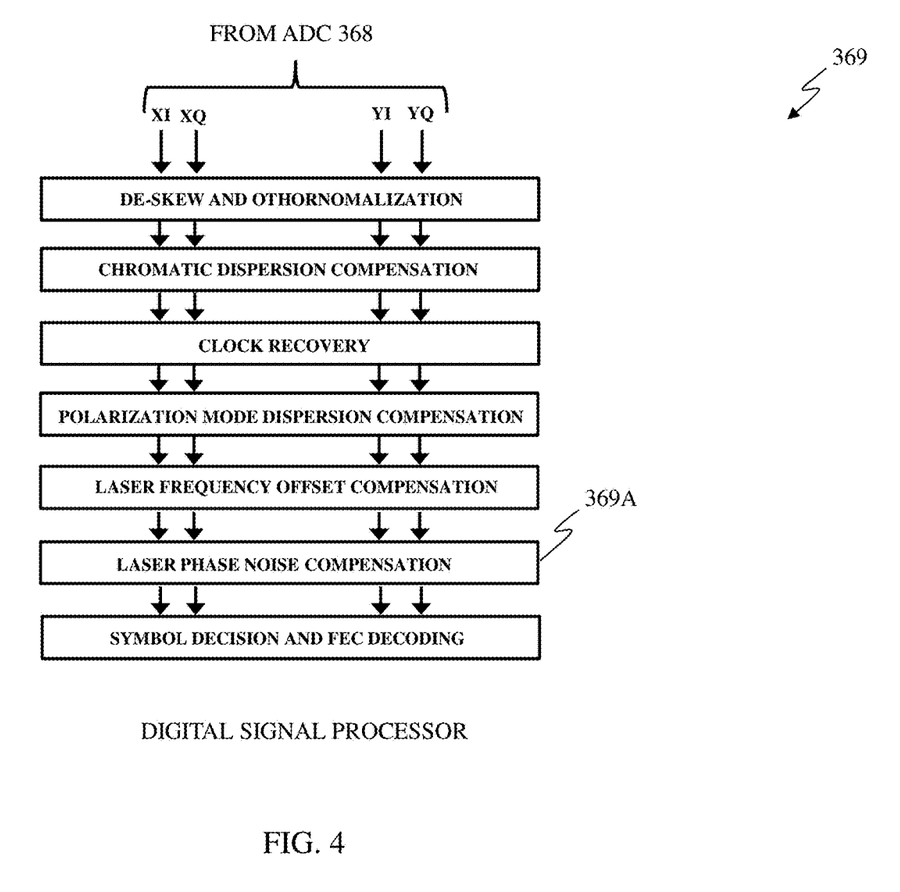
FIG. 4 illustrates another block diagram schematically illustrating a digital signal processor of a coherent optical receiver as may be employed in the coherent optical communication system of FIG. 1.

FIG. 4 illustrates another block diagram schematically showing a digital signal processor of a coherent optical receiver as may be employed in the coherent optical communication system of FIG. 1. In FIG. 4, a block diagram is presented that is representative of the digital signal processor (DSP) 369 of the coherent optical receiver 115. As shown, the DSP 369 receives two sets of in-phase and quadrature-phase input signals from the ADC 368. These signals include sequences or blocks of transmission frames that allow quantification and compensation of laser phase noise in the receiver 115. This quantified and compensation is achieved in DSP stage 369A.

Returning to FIG. 1, the optical receiver 115 includes a phase noise estimator 117 having a frame comparator 119, a pilot processor 121 and a frame processor 123, and a data output 130.

The frame formatter 107 and the phase noise estimator 117, or at least a portion thereof, can be implemented employing the appropriate circuitry, as noted above. The optical transmitter 105 can include other components of a conventional coherent optical transmitter, such as, amplifiers, filters, an optical source, and an optical modulator coupled to the optical link 125. The optical receiver 115 can include other components of a conventional coherent optical receiver, such as, an optical-to-electrical receiver coupled to the optical link 125, a local optical source coupled thereto, analog-to-digital converters and DSPs.

The optical transmitter 105 employs the data input 101 to provide data symbols for formatting and transmission. The frame formatter 105 employs the pilot generator 109 to provide pilot symbols, and the frame generator 111, coupled to the pilot generator 109, is employed to format optical transmission frames. Each of the optical transmission frames includes the pilot symbols arranged with the data symbols in a pattern that provides determination of a reception phase noise of transmitted optical transmission frames sent over the optical link 125 and received at the optical receiver 115. The reception phase noise determination is based solely on the pilot symbols, and each optical transmission frame includes a transmission frame length containing a total of N symbols with P pilot symbols periodically inserted within the data symbols such that N is an odd number integer multiple of P.

The optical receiver 115 employs the phase noise estimator 117 to determine a phase noise for the optical transmission frames. The phase noise estimator 117 correspondingly employs the frame comparator 119 to compare received pilot symbols of the optical transmission frame with a reference pilot symbol to determine pilot phase angles between the received and reference pilot symbols. The pilot processor 121 is coupled to the frame comparator and generates pilot transform coefficients based on the pilot phase angles and pilot transform basis functions. The frame processor 123 is coupled to the pilot processor and determines a received phase noise value for the optical transmission frame based on the pilot transform coefficients and frame transform basis functions. The received phase noise value is employed to provide a de-rotation of data symbols prior to their being delivered to the data output 130.

Figure 5:
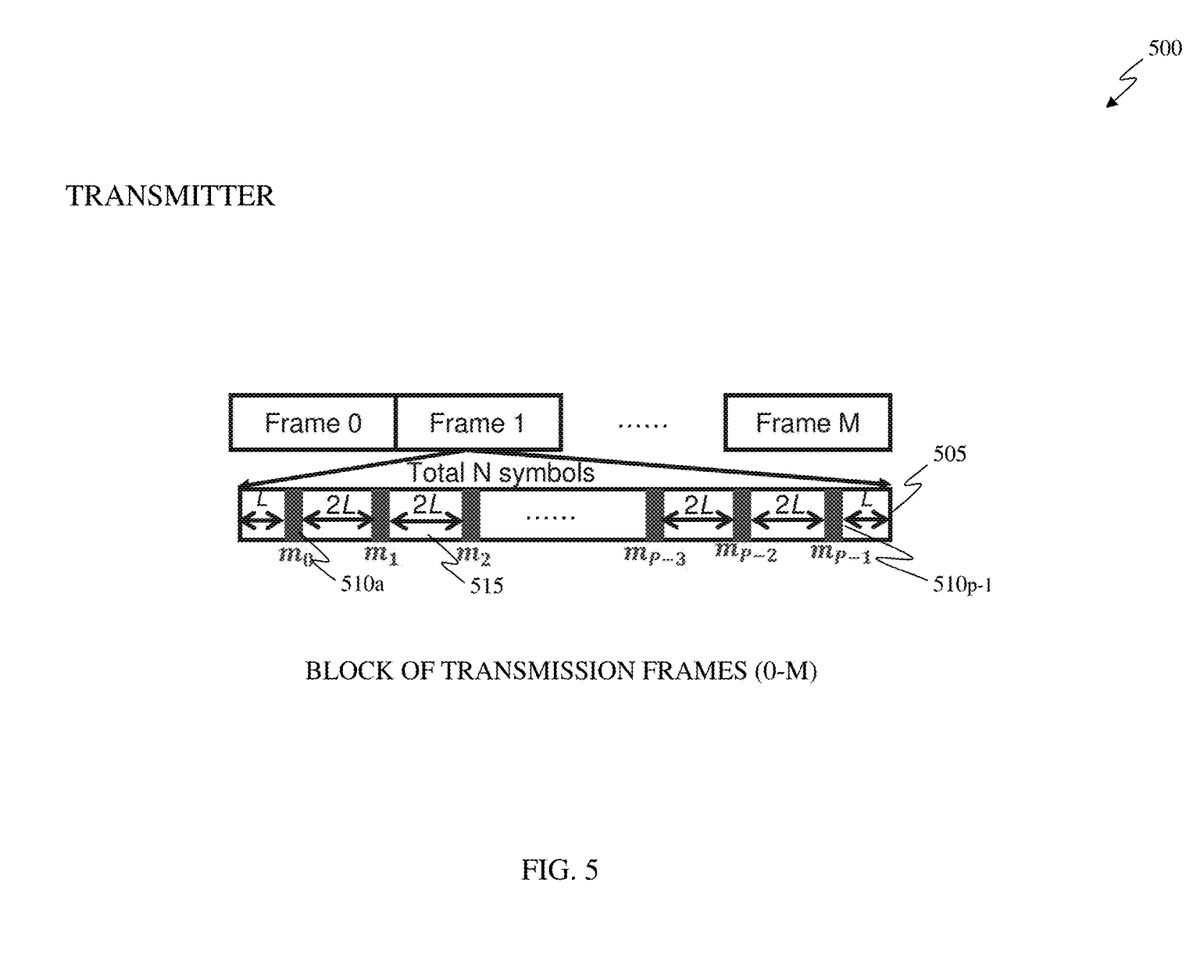
FIG. 5 illustrates a diagram of an embodiment of a sequence of transmission frames as may be employed in the coherent optical communications system of FIG. 1.

FIG. 5 illustrates an embodiment of a sequence or block of transmission frames, generally designated 500, as may be employed in the coherent optical communication system 100. The specific arrangement of the block of transmission frames 500 is based on employing feedforward, pilot-aided, discrete cosine transform (PA-DCT) analysis for phase noise estimation. The block of transmission frames 500 includes M transmission frames (i.e., frames (0-M)) wherein frame 1 is typical. An expanded frame 205 is organizationally representative of each of the frames (0-M). The expanded frame 505 has a total of N symbols that include pilot reference symbols $510_a$ through $510_{p-1}$, which are periodically inserted between groups of data symbols, wherein a group of data symbols 515 is typical.

These P pilot symbols are periodically inserted into each transmission frame containing a total of N symbols, where N/P=(2L+1), with L being a positive integer. That is, the frame length is an odd number multiple of the pilot symbols. The positions of the pilot symbols are defined as $m_i$=i(2L+1)+L, i=0, 1, . . . , P−1, as may be seen in FIG. 5.

Figure 6:
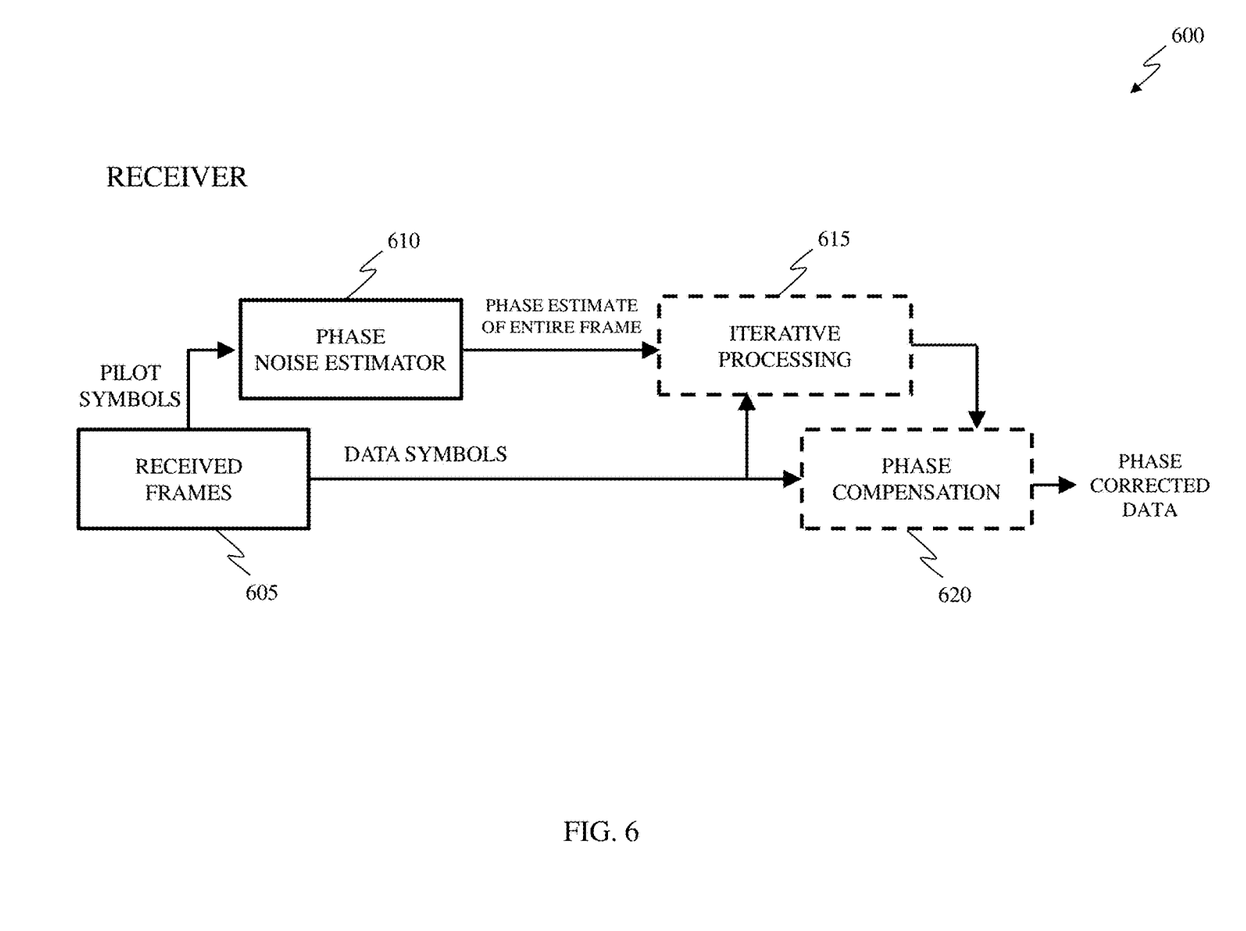
FIG. 6 illustrates a block diagram of a reception signal processing diagram for an embodiment of a phase noise estimator as may be employed in a digital signal processor (DSP) of a coherent optical receiver, such as the coherent optical receiver of FIG. 1.

FIG. 6 illustrates an embodiment of a reception signal processing diagram, generally designated 600, having a phase noise estimator as may be employed with an optical receiver, such as the optical receiver 115 of FIG. 1 above. The reception signal processing diagram 600 includes processing blocks of received frames 605 and a phase noise estimator 610 that are coupled to blocks for iterative processing 615 and phase compensation 620, as shown.

In the reception signal processing diagram 600, the received frames 605 provide pilot symbols from optical transmission frames to be processed by the phase noise estimator 610, which provides phase estimates for an entire optical transmission frame that are based just on the pilot symbols. These phase estimates are processed iteratively in the iterative processing block 615, along with data symbols from the optical transmission frames, to provide phase-corrected data symbols from the phase compensation block 620.

Figure 7:
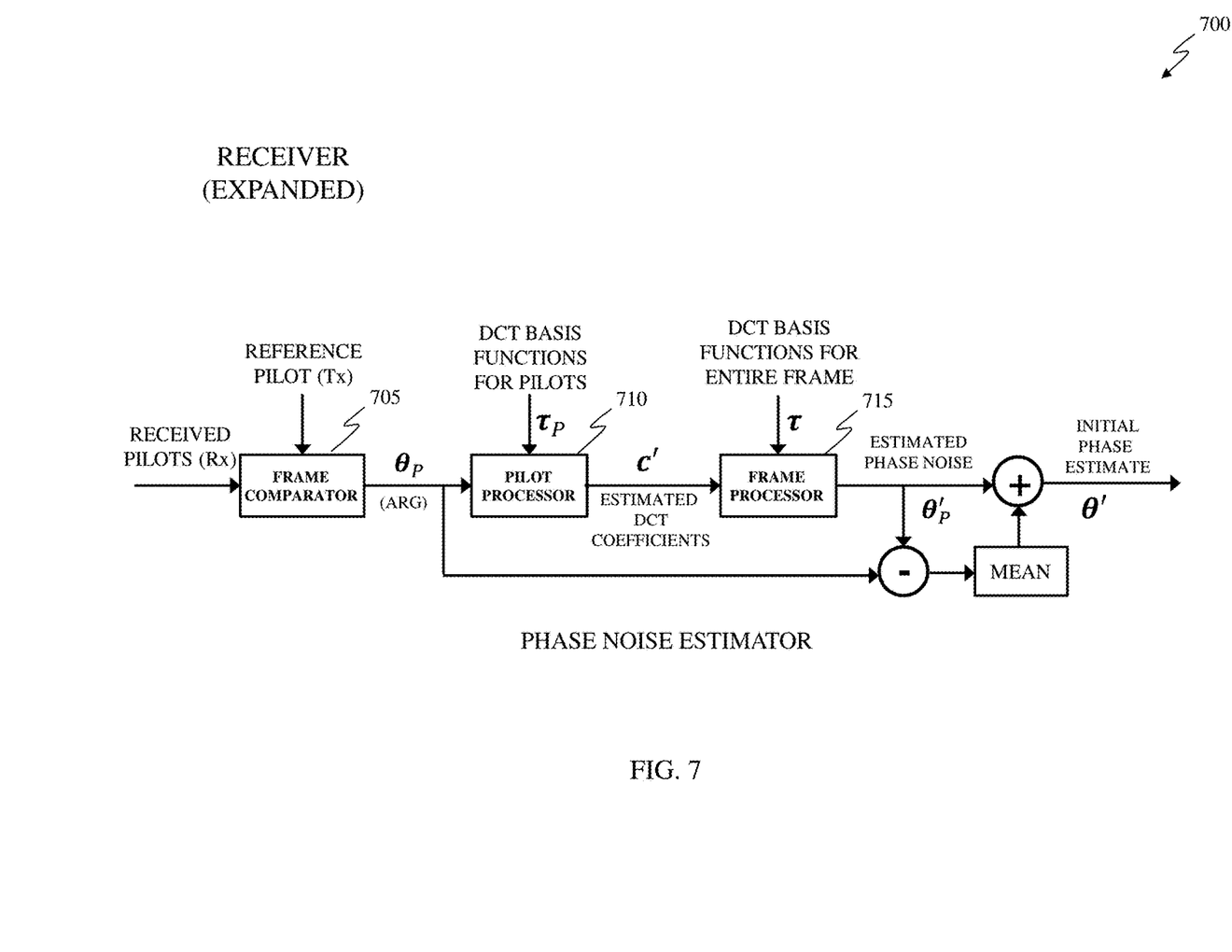
FIG. 7 illustrates an embodiment of an expanded reception signal processing diagram of a phase noise estimator as may be employed in DSPs of the embodiments of FIGS. 1 and 6 above.

FIG. 7 illustrates an embodiment of an expanded reception signal processing diagram of a phase noise estimator, 700, on the received modulated optical carrier as may be employed in the embodiments of FIGS. 1 and 6 above. The phase noise estimator 700 includes a frame comparator 705, a pilot processor 714 and a frame processor 715.

The frame comparator 705 compares received pilot symbols of an optical transmission frame of a coherent optical system with a reference pilot symbol to determine relative pilot phase angles $\theta_{m_i}$ between the received and reference pilot symbols. The reference pilot symbol is, for example, a locally stored example of the pilot symbol originally modulated onto the optical symbol of the optical transmission frame of the coherent optical transmitter.

In the illustrated embodiment of FIG. 7 the pilot processor 710 generates pilot discrete cosine transform (DCT) coefficients $c_k$ for pilot transform coefficients that are based on the measured relative phase angles $\theta_{m_i}$ and pilot DCT basis functions for pilot transform basis functions. Additionally, the frame processor 715 determines a received phase noise value $\theta(n)$ for the optical transmission frame based on the DCT coefficients C and frame DCT basis functions for frame transform basis functions. Calculation of a mean value of the received phase noise value $\theta(n)$ provides an average received phase noise value $\hat\theta(n)$. The phase noise estimation is performed frame by frame, and it does not involve any averaging process between different frames or within the frame. The average process is for calculation of the calibration angle, which is a single constant that applied to the phase noise estimation of the entire frame, is for preventing phase wrapping.

Now, assuming perfect synchronization at an optical receiver and that phase noise is the only other uncompensated subsystem impairment, the received signals for each frame can be represented as:

$$r(n)=a(n)e^{j\theta(n)}+w(n), w(n)\sim CN(0,\sigma_w^2)\ n=0,1,\ldots,N-1 \quad (1)$$

where $a(n)$ is the nth transmitted symbol, $w(n)$ is the complex additive Gaussian noise and $\theta(n)$ denotes the received phase noise value that is modelled as a low pass filter process (e.g., such as a laser phase noise). Instead of using the well-known Wiener process to model $\theta(n)$, the fact that $\theta(n)$ has a Lorentzian spectrum may be exploited, which is the power spectrum of a first-order low pass filter (LPF) corresponding to the low-pass nature of laser phase noise.

A low-pass process may be approximated by the linear combination of unknown coefficients and known orthonormal basis functions. Then, $$\theta(n)\approx c^T\tau_n, \quad (2)$$

where $c=[c_0, c_1, \ldots, c_{k-1}]^T$ and $\tau_n=[\tau_{n,0}, \tau_{n,1}, \ldots, \tau_{n,K-1}]^T$ are K×1 coefficient and basis function vectors, respectively. And it is noted that K is required to be smaller than pilot symbol length P for a valid solution. Here the quantity $[\bullet]^T$ denotes the vector or matrix transpose. In order to reduce the number of unknown parameters to be estimated, it is necessary to minimize K.

So, in this embodiment, the discrete cosine transform (DCT) is chosen, since it packs the energy of the spatial sequence in a way that is more compact than other transforms (e.g., the discrete Fourier transform (DFT)). This selection allows fewer coefficients to represent the signal after transformation. The DCT basis functions may be described as:

$$\tau_{n,0}=\sqrt{\frac{1}{N}}\ ;\ \tau_{n,k}=\sqrt{\frac{1}{N}}\cos\left(\frac{\pi k(n+0.5)}{N}\right)\ \text{for}\ k\neq 0. \quad (3)$$

where n indicates the element within the vector and N stands for the length of each frame.

As indicated in FIG. 3, the received pilot symbols are first extracted from each frame and compared to the transmitted pilots to attain a P×1 observation vector $\theta_p'=[\theta_{m_0}', \theta_{m_1}', \ldots, \theta_{m_{p-1}}']^T$. The least square estimation of c can be calculated as:

$$c'=(\tau_p^T\tau_p)^{-1}\tau_p^T\theta_p', \quad (4)$$

where $\tau_p=[\tau_{m_0}, \tau_{m_1}, \ldots, \tau_{m_{p-1}}]^T$ is the P×K discrete cosine transform matrix for the observation samples. The predefined pilot positions $m_i$ allow $\tau_p^T\tau_p$ to be diagonal. That is, $(\tau_p^T\tau_p)^{-1}=(N/P)I_k$ where $I_K$ is a K×K identity matrix, thereby largely simplifying the calculation of c'.

The initial phase noise estimation of the entire frame $\theta'$ can then be attained using Eq. (2) with c'. A calibration process is necessary to prevent phase wrapping, that is to compare estimated phase noise at pilot positions $\theta'(m_i)$ to the observation vector $\theta_p'$, take the average of the comparisons as a constant phase that applied to prevent the entire frame phase noise estimation from phase wrapping issue. This first-stage phase noise estimation is transparent to data formats since it only uses pilots. Additionally, the computational complexity is low because no complex multiplication is required. Moreover, this pilot-aided approach effectively mitigates cyclic phase slipping, so differential coding is not necessary.

When large phase noise is present, further processing may be needed, and the process searches the coefficients c'' with the intent of minimizing the cost function:

$$\Sigma_{n=0}^{N-1}|\arg(r(n)d(n)^*)-c''^T\tau_n|^2, \quad (5)$$

where a quantity $[\bullet]^*$ stands for complex conjugate operation, and $d(n)$ is the decision of the data symbols after de-rotated by the initial phase noise estimation. That is, the estimated $\theta'$ may be applied to de-rotate the received data symbols, make symbol decisions of the de-rotated symbols, use it as extra pilot symbols to compare to the received data symbols to obtain a full observation vector to re-estimate c'. This process may be conducted iteratively to approach an optimal estimation performance. With a code-aided transmission, soft symbol decisions can be obtained from the marginal a posteriori symbol probabilities that are provided by an FEC decoder. Otherwise, a decision detector can be used in non-code aided cases.

Figure 8:
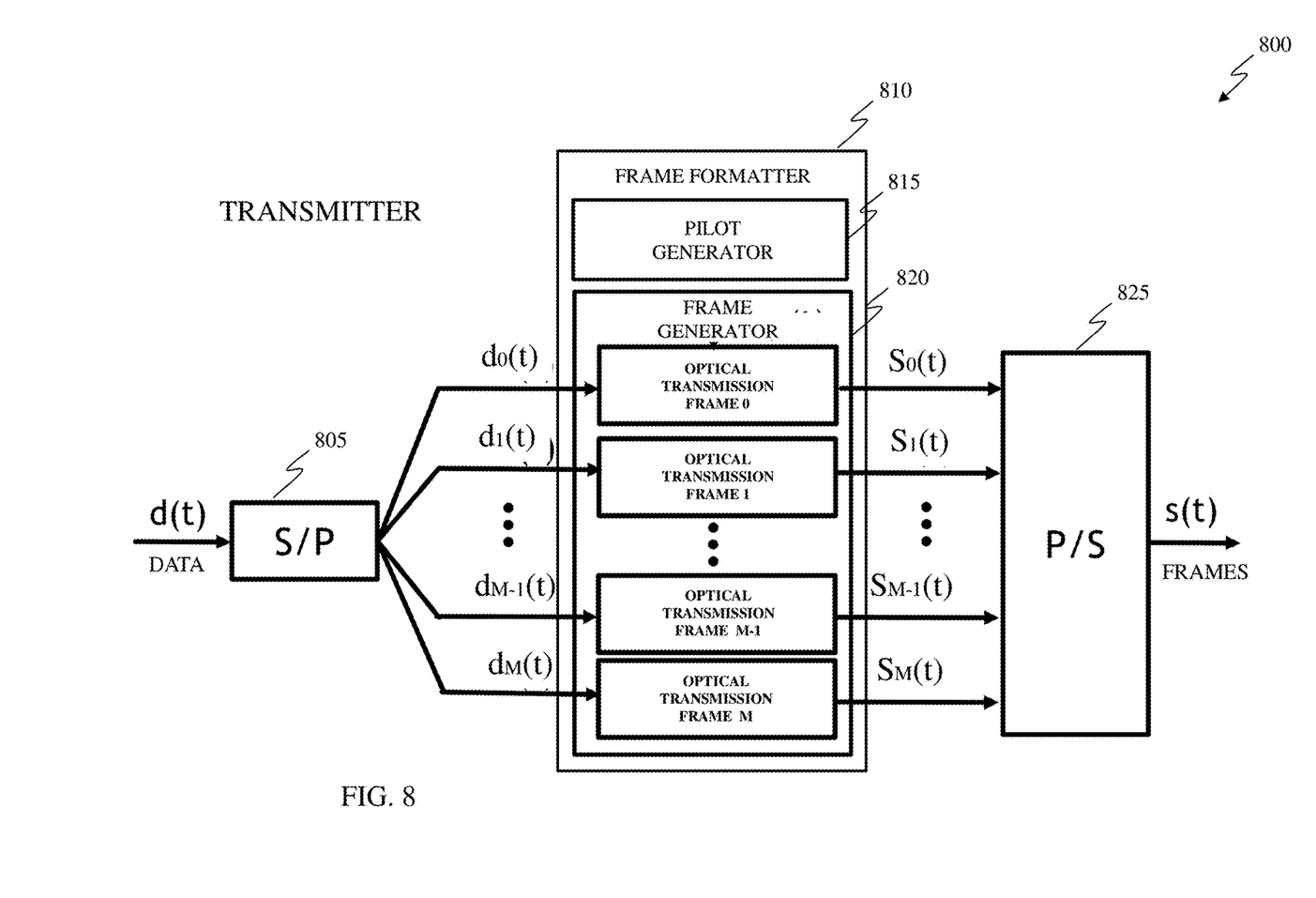
FIG. 8 illustrates a diagram of an embodiment of a portion of an electronic controller for driving an optical modulator of a coherent optical transmitter constructed according to the principles of the present disclosure.

FIG. 8 illustrates an embodiment of a portion of an optical transmitter as may be employed in a coherent optical system, generally designated 800, constructed according to the principles of the present disclosure. The transmitter portion 500 includes a serial to parallel converter 505, a transmission frame formatter 810, having a pilot generator 815 and a frame generator 820, and a parallel to serial converter 825.

The serial to parallel converter 805 converts serial transmission data into parallel transmission data streams. The transmission frame formatter 810 is coupled to the serial to parallel converter 805 and formats each of the parallel transmission data streams along with transmitter pilot symbols into parallel transmission frames, wherein each parallel transmission frame includes a transmission frame length containing a total of N symbols with P pilot reference symbols periodically inserted within the data symbols such that N is an odd number integer multiple of P. The parallel to serial converter 825 formats the parallel transmission frames into serial optical transmission frames.

The transmitter portion 800 may reside in a baseband electrical digital signal processing stage, and after serial to parallel conversion (S/P), the incoming data symbols d(t) are sorted into M parallel frames $d_k(t)$, k=1, 2, ... M, with D data symbols per frame. For each frame, P pilot symbols t_p(t) are inserted and the pilot symbol positions in each frame are specially defined to enable simple optical receiver processing as previously discussed with respect to FIGS. 1-7. The pilot symbols are the same for all frames, and after pilot symbol insertion, each frame $s_k(t)$ contains D+P symbols. Then, the parallel to serial conversion (P/S) forms serialized transmission symbols s(t) that may drive an electro-optic modulator in some applications.

Figure 9:
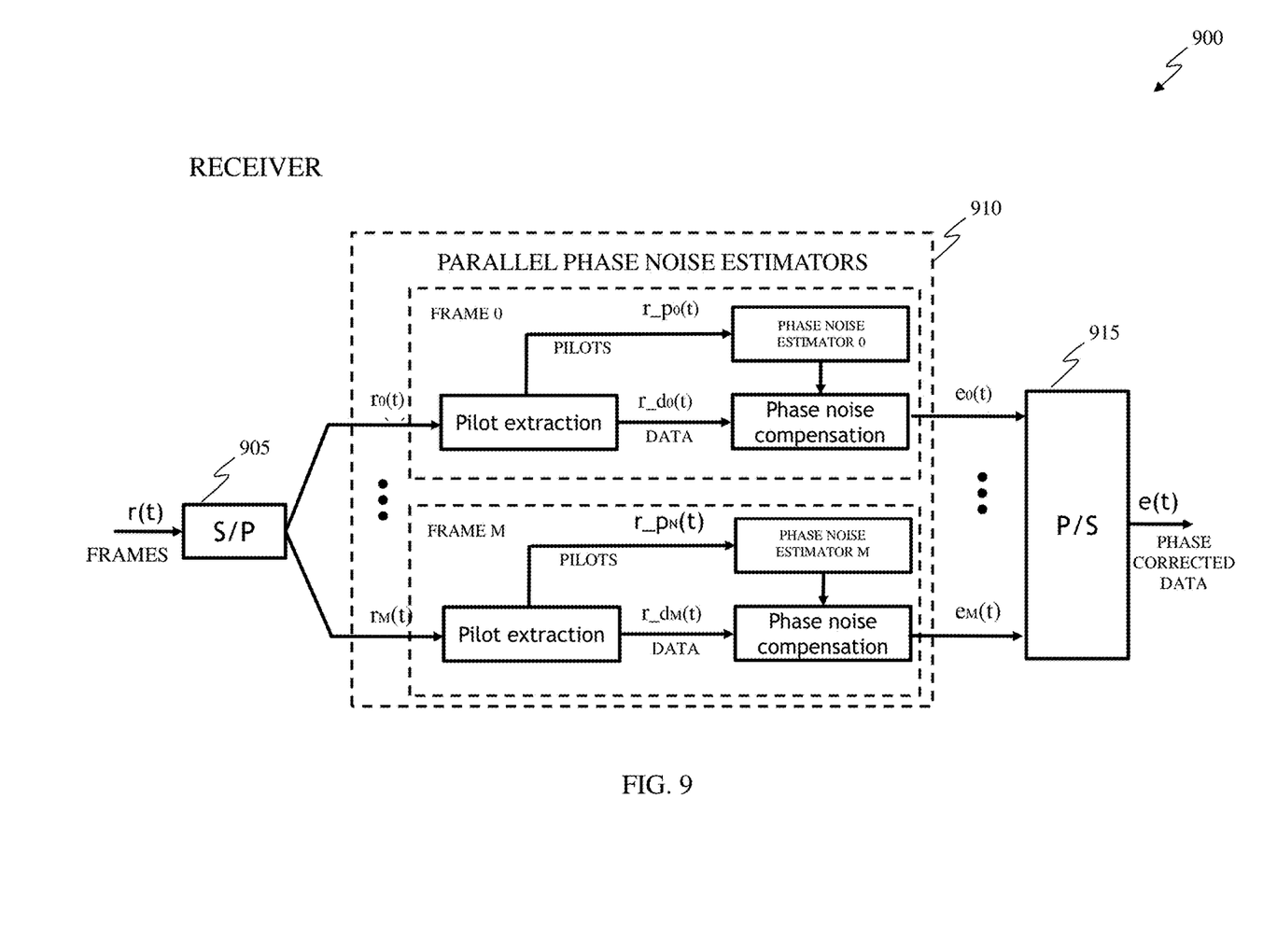
FIG. 9 illustrates a block diagram of an embodiment of a portion of a DSP in a coherent optical receiver constructed according to the principles of the present disclosure.

FIG. 9 illustrates an embodiment of a portion of an optical receiver as may be employed in a coherent optical system, generally designated 900, constructed according to the principles of the present disclosure. The receiver portion 900 includes a serial to parallel converter 905, parallel phase noise estimators 910 and a parallel to serial converter 915.

Here, optical signals are detected by a coherent receiver and sampled by an analog to digital converter. Then, after synchronization, clock recovery, channel equalization and frequency offset compensation, the signals r(t) are parallelized into frames $r_k(t)$ having data and pilot (D+P) symbols per frame, where the received P pilot symbols $r\_p_k(t)$ are extracted from their corresponding positions. If there is a residual frequency offset, the pilot symbols can be first used to estimate and compensate for the residual frequency offset by comparing the phases between the pilot symbols, and then using this outcome for phase noise estimation of the entire frame. The estimated phase noise can be used for phase de-rotation of the data symbols of each frame. After phase noise compensation, the data symbols are serialized and sent to a decision circuit for decoding.

As discussed before, the parallel phase noise estimators 910, may employ a process based on discrete cosine transform (DCT) analysis, which defines a phase noise of each frame to be a low-pass process with unknown tap (DCT) coefficients and known DCT basis functions. This process starts by first comparing the phase between the received and transmitted pilot symbols to attain P observations of this low-pass process. Then, the DCT coefficients are derived from these P observation phases by using a simplified least-squares solution. Then, the DCT coefficients are employed to calculate the phase noise of the data symbols (D).

Figure 10:
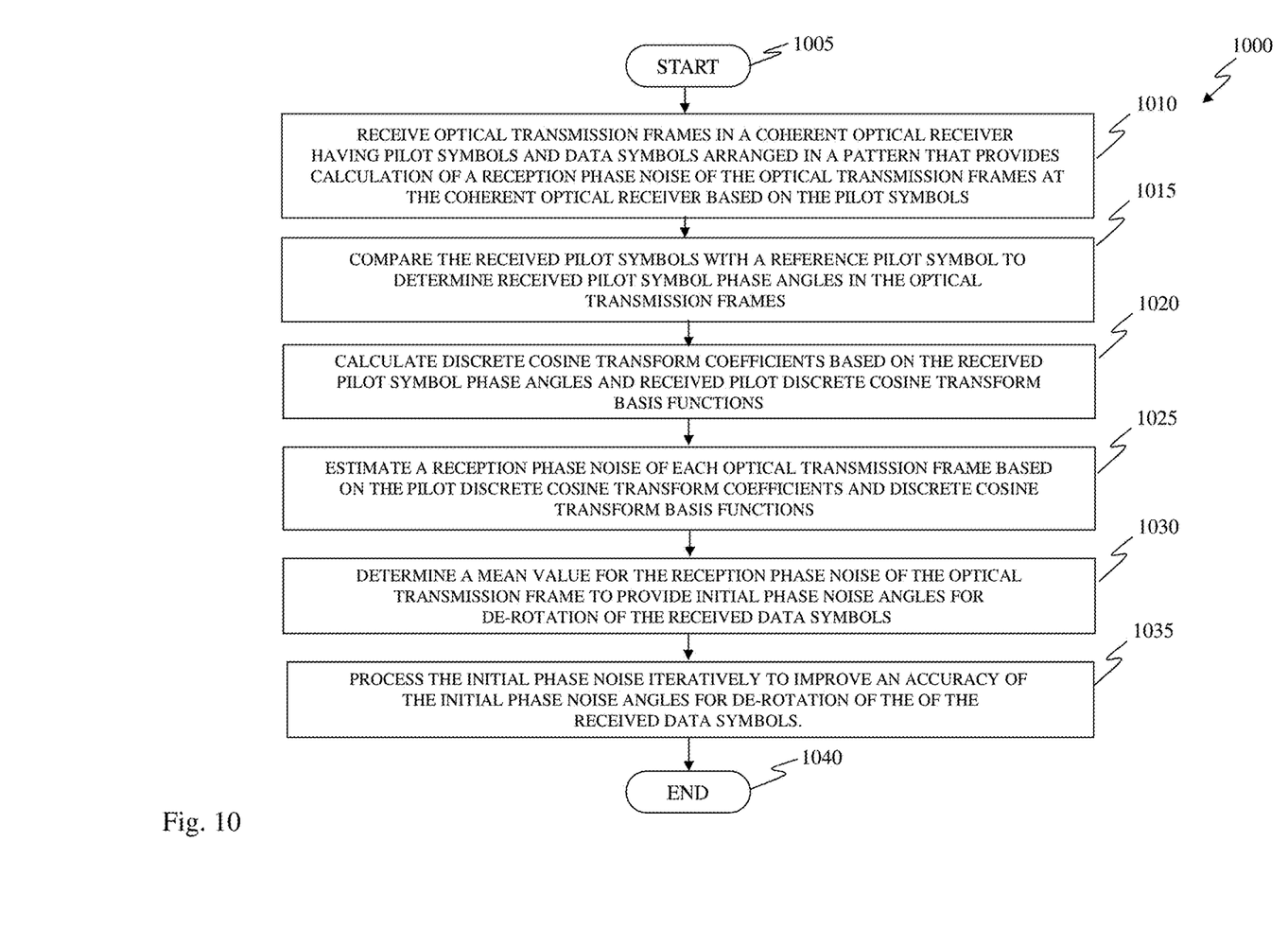
FIG. 10 illustrates a flow diagram of an embodiment of a method of estimating a phase noise carried out in accordance with the principles of the present disclosure, for example, in a DSP of a coherent optical receiver as used in the apparatus of FIGS. 3, 4 and/or 6.

FIG. 10 illustrates a flow diagram of an embodiment of a method of estimating a phase noise in an optical receiver of a coherent optical receiver, generally designated 1000, carried out in accordance with the principles of the present disclosure. The method 1000 starts in a step 1005. Then, in a step 1010, optical transmission frames are received having pilot symbols and data symbols arranged in a pattern that provides for calculation of a reception phase noise of the optical transmission frames at the coherent optical receiver based on the pilot symbols.

The received pilot symbols are compared with a reference pilot symbol to determine received pilot symbol phase angles in the optical transmission frames, in a step 1015. Discrete cosine transform coefficients are calculated based on the received pilot symbol phase angles and received pilot discrete cosine transform basis functions, in a step 1020. A reception phase noise of the optical transmission frame is estimated based on the pilot discrete cosine transform coefficients and discrete cosine transform basis functions for the optical transmission frame, in a step 1025.

A mean value for the reception phase noise of the optical transmission frame is determined to provide initial phase noise angles for de-rotation of the received data symbols, in a step 1030. The initial phase noise angles are processed iteratively to improve an accuracy of the initial phase noise angles for de-rotation of the received data symbols, in a step 1035.

In one embodiment, the reference pilot symbol is a stored example of a pilot symbol originally used to generate the received pilot symbols of the optical transmission frame of the coherent optical system. Correspondingly, each optical transmission frame contains a total of N symbols with P pilot symbols periodically inserted within the data symbols such that N is an odd number integer multiple of P.

In another embodiment, the reception phase noise of the receiver is modelled as a low pass filter process. Correspondingly the low pass filter process is approximated by the linear combination of pilot coefficients and frame orthonormal basis functions.

In yet another embodiment, the calculation of the reception phase noise of the optical transmission frames at the receiver is solely a feed-forward process in the receiver. The method 1000 ends in a step 1040.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

By modeling phase noise as a low-pass filter, a pilot-aided phase noise estimation approach has been presented that may be employed for single-carrier high-order QAM coherent optical systems. The approach allows feed-forward and parallel processing with low circuit complexity. The scheme was verified in an 11-Gbaud PDM, a 128-QAM (154-Gb/s) and a PDM-256-QAM (176-Gb/s) experiments with a BER below 20 percent of an FEC limit. Single-stage, pure pilot-based processing was found to be usually sufficient to cope with the phase noise generated by lasers having small linewidths.

Those skilled in the art to which this application relates will appreciate that other and further additions, deletions, substitutions and modifications may be made to the described embodiments.

The above-described systems and methods or at least a portion thereof may be embodied in or performed by various processors, such as microprocessors, digital data processors, digital signal processors, or other computing devices, wherein the various processors are programmed or store executable programs or sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. An apparatus comprising:
    an electronic digital signal processor having electrical inputs for receiving a first sequence of measurement values of a transmitted modulated optical carrier received in a coherent optical receiver and having electrical outputs for a stream of determined transmitted data symbol values demodulated therein from the first sequence, and wherein the electronic digital signal processor has first circuitry to determine phase offsets of received pilot symbol values from the first sequence;

wherein the electronic digital signal processor calculates pilot transform coefficients utilizing received pilot symbol phase angles; and wherein the electronic digital signal processor has second circuitry to correct phase offsets of received ones of the data symbol values from the determined phase offsets of the received pilot symbol values, utilizing the pilot transform coefficients, and wherein the pilot symbol values are temporally inserted between groups of the data symbol values in the transmitted modulated optical carrier.

2. The apparatus of claim 1, wherein the electronic digital signal processor includes a memory to store information indicative of a transmitted sequence of the received pilot symbol values.

3. The apparatus of claim 2, wherein the electronic digital signal processor is configured to estimate phase offsets of some of the data symbol values by interpolating between the determined phase offsets of the received pilot symbol values.

4. The apparatus of claim 3, further comprising the optical coherent receiver having an optical local oscillator therein and having one or more optical hybrids connected to interfere light of the transmitted modulated optical carrier received with light of the optical local oscillator.

5. The apparatus of claim 4, wherein the electronic digital signal processor has third circuitry configured to estimate a frequency offset between the local optical oscillator and an optical carrier frequency of the transmitted modulated optical carrier received by measuring a temporal rotation of a constellation of the data symbol values from the first sequence of measurement values.

6. The apparatus of claim 1, wherein the electronic digital signal processor is configured to estimate phase offsets of some of the data symbol values by interpolating between the determined phase offsets of the received pilot symbol values.

7. The apparatus of claim 1, further comprising the optical coherent receiver having an optical local oscillator therein and having one or more optical hybrids connected to interfere light of the transmitted modulated optical carrier received with light of the optical local oscillator.

8. The apparatus of claim 7, wherein the electronic digital signal processor has third circuitry configured to estimate a frequency offset between the local optical oscillator and an optical carrier frequency of the transmitted modulated optical carrier received by measuring a temporal rotation of a constellation of the data symbol values from the first sequence of measurement values.

9. The apparatus of claim 7, wherein the electronic digital signal processor is configured to demodulate a stream of data symbol values transmitted in a quadrature amplitude modulation constellation.

10. The apparatus of claim 9, wherein the quadrature amplitude modulation constellation has more than 16 symbol values.

11. The apparatus of claim 9, wherein the quadrature amplitude modulation constellation has more than 64 symbol values.

12. The apparatus of claim 1, wherein the electronic digital signal processor is configured to demodulate a stream of data symbol values transmitted in a quadrature amplitude modulation constellation.

13. The apparatus of claim 1, wherein the pilot transform coefficients are pilot discrete cosine transform coefficients and are determined based on the pilot symbol phase angles.

14. A method, comprising:
in a coherent optical receiver, receiving optical transmission frames having pilot symbols and data symbols arranged in a pattern;
comparing the pilot symbols received with one or more reference pilot symbols to determine received pilot symbol phase angles;
calculating discrete transform coefficients based on the received pilot symbol phase angles; and
estimating a reception phase noise of each optical transmission frame based on the discrete transform coefficients.

15. The method as recited in claim 14 further comprising determining a mean value for the reception phase noise of the optical transmission frames to provide initial phase noise angles for de-rotation of the received data symbols.

16. The method as recited in claim 14 further comprising processing initial phase noise angles iteratively to improve an accuracy of the initial phase noise angles for de-rotation of received data symbols.

17. The method as recited in claim 14 wherein each optical transmission frame contains a total of N symbols with P pilot symbols periodically inserted within the data symbols such that N is an odd number integer multiple of P.

18. The method as recited in claim 14, wherein the calculating discrete transform coefficients is additionally based on received pilot symbol discrete cosine transform basis functions.

19. A system, comprising:
a digital signal processor (DSP), of a coherent optical receiver, wherein the DSP comprises:
a frame comparator circuit to compare received pilot symbols of an optical transmission frame with a reference pilot symbol to determine pilot phase angles between the received pilot symbols and reference pilot symbols;
a pilot processor circuit that generates pilot transform coefficients based on the pilot phase angles; and
a frame processor circuit to determine a received phase noise value for the optical transmission frame based on the pilot transform coefficients.

20. The system as recited in claim 19 wherein the pilot transform coefficients are pilot discrete cosine transform coefficients that are based on the phase angles between the received pilot symbols and reference pilot symbols.

21. The system as recited in claim 20 wherein each optical transmission frame contains a total of N symbols with P pilot symbols periodically inserted within data symbols such that N is an odd number integer multiple of P.

22. The system as recited in claim 19 further comprising the frame processor determining a mean value of the received phase noise value for the optical symbol frame to provide an initial phase noise angle for de-rotation of received data symbols.

23. The system as recited in claim 19, wherein the pilot processor circuit additionally utilizes pilot transform basis functions.

* * * * *